United States Patent [19]

Fujimori

[11] Patent Number: 5,289,736
[45] Date of Patent: Mar. 1, 1994

[54] STEERING WHEEL ROTATING APPARATUS FOR PHYSICALLY HANDICAPPED PERSONS

[76] Inventor: Yoshio Fujimori, 6-31, Kajino-cho 2 chome, Koganei-shi, Tokyo, Japan

[21] Appl. No.: 820,816

[22] Filed: Jan. 15, 1992

[30] Foreign Application Priority Data

Jan. 31, 1991 [JP] Japan .................. 3-009408[U]

[51] Int. Cl.⁵ .................. G05G 1/10; B62D 1/06
[52] U.S. Cl. .................. 74/557; 74/552; 74/553
[58] Field of Search ............ 74/557, 552, 551.1, 74/551.8; 280/779, 731

[56] References Cited

U.S. PATENT DOCUMENTS

| | | | |
|---|---|---|---|
| 2,425,055 | 8/1947 | Taylor | 74/557 |
| 2,437,575 | 3/1948 | White | 74/557 |
| 2,482,641 | 9/1949 | Stites | 74/557 |
| 2,549,774 | 4/1951 | Chambers | 74/557 |
| 2,592,413 | 4/1952 | Garfield | 74/557 |
| 2,716,903 | 9/1955 | Hansen | 74/557 |
| 2,932,982 | 4/1960 | Enders | 74/552 |
| 3,282,124 | 11/1966 | Peterson | 74/557 |
| 3,554,052 | 1/1971 | Mross | 74/557 |
| 3,776,064 | 12/1973 | Rose | 74/557 |
| 5,007,301 | 4/1991 | Powell | 74/557 |

FOREIGN PATENT DOCUMENTS

| | | | |
|---|---|---|---|
| 59-36518 | 10/1984 | Japan | 74/553 |
| 602403 | 7/1978 | Switzerland | 74/557 |

Primary Examiner—Vinh T. Luong
Attorney, Agent, or Firm—Leydig, Voit & Mayer

[57] ABSTRACT

A steering wheel rotating apparatus for physically handicapped persons includes a grip holder having a grip fitting hole and an engaging member projectable from the inside surface of the grip fitting hole. The grip holder is fixed to the steering wheel of an automobile. A rotary grip has a shaft fittable into the grip fitting hole and a grip body part rotatably fitted to the shaft so that a physically handicapped person may operate the steering wheel using the rotary grip. When a non-physically handicapped person is to operate the steering wheel, the rotary grip may be removed so as not to interfere with steering wheel operation.

10 Claims, 8 Drawing Sheets

STEERING WHEEL ROTATING APPARATUS FOR PHYSICALLY HANDICAPPED PERSONS

BACKGROUND OF THE INVENTION

1. Field of the Invention

This invention relates to a steering wheel rotating apparatus to be used by physically handicapped persons in operating automobiles and more particularly to a steering wheel rotating apparatus so that physically handicapped persons can operate the steering wheel with one hand when the brake and accelerator are manually operated.

2. Description of the Prior Art

Generally, as the accelerator and brake of an automobile are operated with a right foot, a person physically handicapped in the lower limbs cannot operate the brake and accelerator. Therefore, various automobile operating apparatus for physically handicapped persons have been proposed so that the accelerator and brake may be manually operated For example, in FIG. 9 is shown an automobile operating apparatus for physically handicapped person suggested by the present applicant in Japanese Utility Model Application Publication No. 36518/1984. In this apparatus, a lever fitting plate 32 is fitted to a steering column 31 and a brake and accelerator operating lever 33 is pivoted on the left side of the lever fitting plate 32 and is operatively connected with a brake and accelerator apparatus. When the operating lever 33 is pushed in as shown by arrow A, the brake will be operated, and when the operating lever is pulled out as shown by arrow B, the accelerator will be operated. In such an apparatus, when the brake and accelerator are to be operated, they have to be operated with one hand (the left hand in this case) and the steering wheel will have to be operated with the only other hand (the right hand in this case). Therefore, a rotary knob 22 is fitted on the right side of the steering wheel 21 so that the steering wheel may be operated by gripping the knob with the right hand.

In the above-mentioned automobile operating apparatus for physically handicapped persons, in case a person physically handicapped in the lower limbs is to operate the automobile, the steering wheel can be operated with one hand using the rotary knob fitted on the right side of the steering wheel. However, if a non-handicapped person is to ordinarily operate the steering wheel and the gripping part of the rotary knob remains fitted to the steering wheel, interference with steering wheel operation, such as catching of the sleeve end of a suit, will likely occur.

SUMMARY OF THE INVENTION

A first object of the present invention is to provide a steering wheel rotating apparatus for physically handicapped persons wherein the steering wheel can be easily operated with one hand by a physically handicapped person who manually operates the accelerator and brake apparatus.

A second object of the present invention is to provide a steering wheel rotating apparatus for physically handicapped persons wherein, if a non-handicapped person is to operate the automobile, the rotary gripping part will be removed by one touch so as not to interfere with ordinary steering wheel operation.

According to the present invention, there is provided a steering wheel rotating apparatus for physically handicapped persons wherein a grip holder having a grip fitting hole and an engaging member projectable from the inside surface of said grip fitting hole is fixed to the steering wheel of an automobile, and a rotary grip having a shaft fittable into said fitting hole and a grip body part rotatably fitted to said shaft can be removably fitted into the grip holder by the operation of the engaging member.

BRIEF DESCRIPTION OF THE DRAWINGS

The above described objects and the other objects of the present invention will be made apparent by the following descriptions and appended drawings. Embodiments of the present invention are exemplified in these descriptions and drawings but it is apparent that various modifications can be made within the scope of the claims.

DETAILED DESCRIPTION OF PREFERRED EMBODIMENTS

Figure 1:
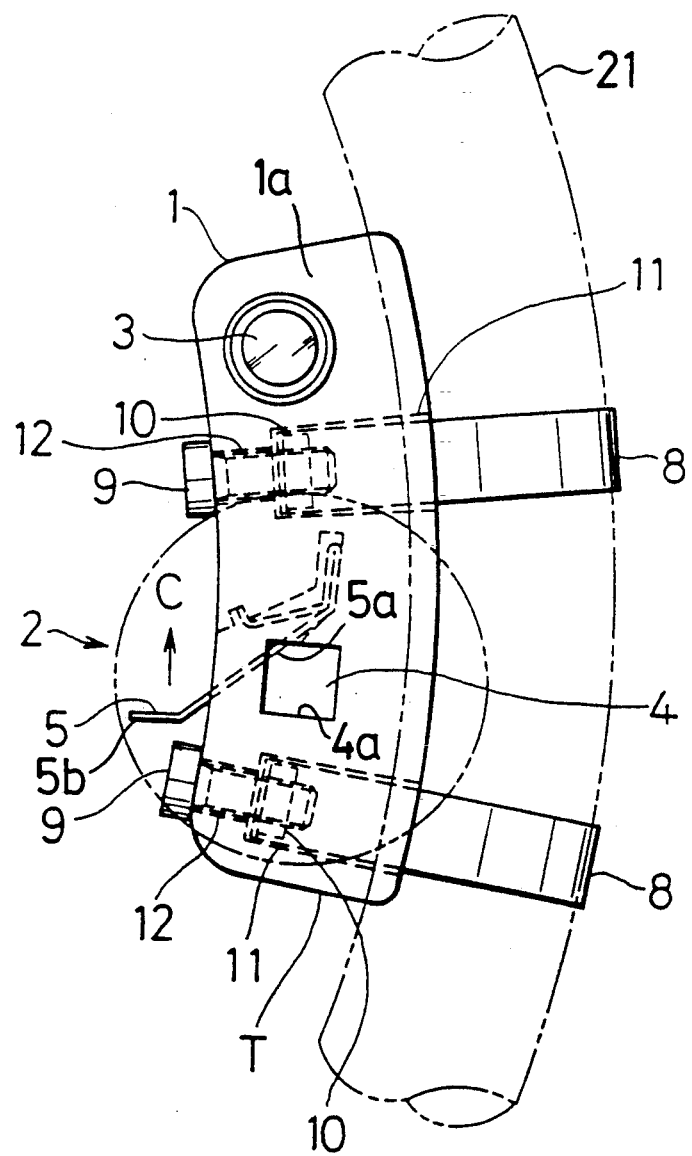
FIG. 1 is a plan view showing a first embodiment of a steering wheel rotating apparatus for physically handicapped persons according to the present invention.
Figure 2:
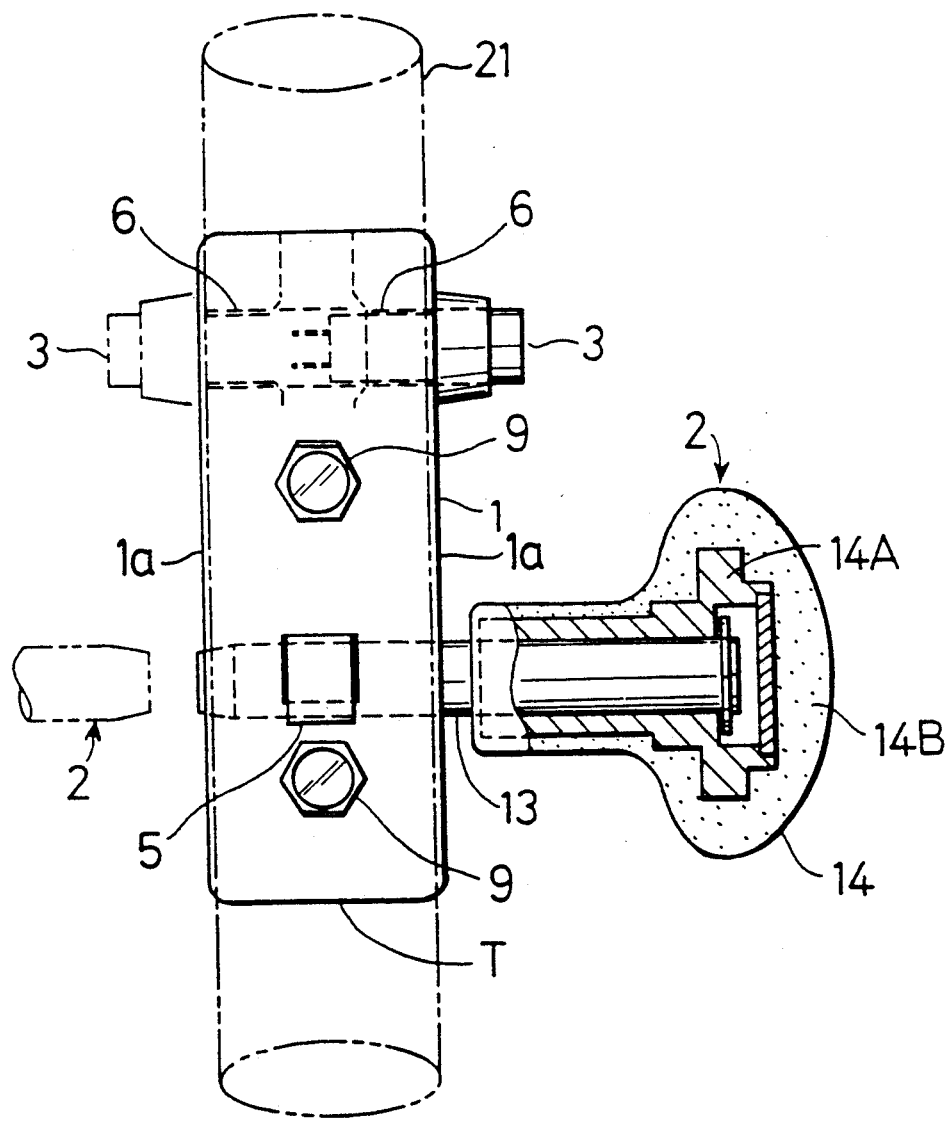
FIG. 2 is a partly sectional elevational view of the apparatus of FIG. 1 as seen from the inner peripheral side of a steering wheel.
Figure 3:
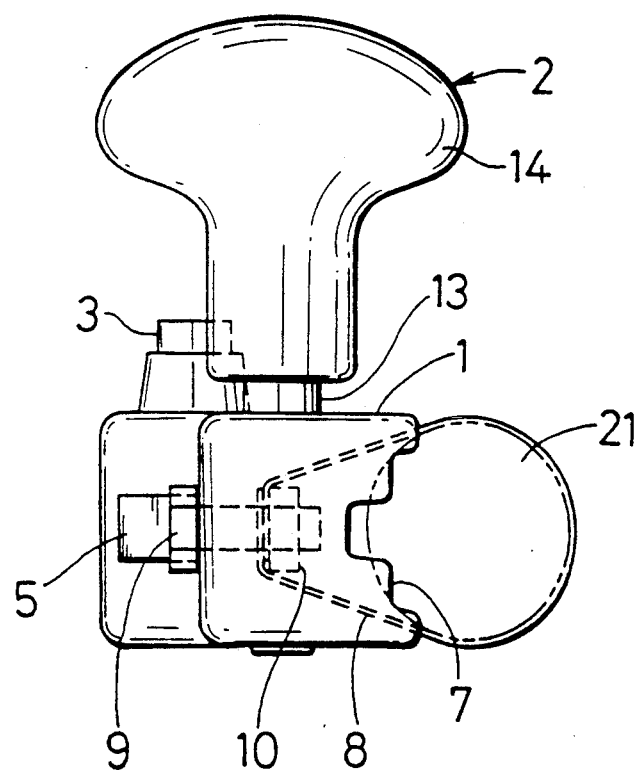
FIG. 3 is a side view of the apparatus of FIG. 1.
Figure 5:
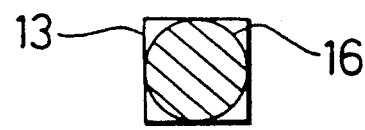
FIG. 5 is a sectional view taken along line V—V in FIG. 4.

A first embodiment of the present invention is shown in FIGS. 1 to 3 in which the reference numeral 1 represents a grip holder made of a resin and fixed to a steering wheel 21 of an automobile, 2 represents a rotary grip removably fitted to the grip holder 1 and used in operating the handle, and 3 represents a push-button type horn switch connected with a horn of the automobile so that a horn will sound when the switch is pushed. The grip holder 1 has first and second opposite sides 1a and is provided with a grip hole 4 in the form of a square through hole having first and second open ends 4a in opposite sides 1a and is fitted with an engaging member in the form of a lever 5 having a movable portion 5a projectable from the inside surface of the grip hole 4. The lever 5 is formed of a flexible metal member or the like. As shown in FIG. 5, the movable portion 5a is biased towards a first position in which it projects into the grip hole 4. An operating portion 5b in the form of the outer end of the lever 5 is used to move the movable portion 5a from the illustrated first position to a second position in which the movable portion 5a is retracted from the grip hole 4. The grip hole 4 is a through hole, and therefore the rotary grip 2 can be inserted from either open end 4a (see the imaginary line in FIG. 2). The horn switch 3 is fitted in a position in which it can be pushed even while gripping the grip and is always on the surface on the side on which the rotary grip 2 is fitted. In the horn switch 3 fitting position there is provided a switch hole 6 in the form of a through hole having first and second open ends, the same as the grip hole 4. Female threads are formed on the inside surfaces of both open end parts of the switch hole 6 so that the horn switch 3 may be threadedly mounted from either open end (shown by the imaginary line in FIG. 2).

The grip holder 1 is curved so as to contact the inner periphery of the steering wheel 21 and has step-like recesses 7, such as shown in FIG. 3, on the outer peripheral surface in contact with the handle to prevent the grip holder 1 from slipping and being displaced when it is fitted on the steering wheel 21. In order to fit the grip holder 1 to the steering wheel 21 of the automobile, two sets of metallic bands 8, bolts 9, and nuts 10 are fitted on both sides of the grip hole 4. Band recesses 11 for fitting the bands 8 on the sides adjoining the step-like recesses 7 and holes 12 for fitting screws inserted through the band recesses 11 from the inner peripheral surface side opposite the step-like recesses 7 are provided. Screw inserting holes are provided at both ends of the band 8. In fitting the grip holder 1 on the steering wheel 21, the bands 8 are wound on the steering wheel 21 so that the rotary grip 2 is on the near side (in the position of the intermediate height of the steering wheel in the straight ahead state) and the horn switch 3 is in a position above it. The bands 8 are pulled at both ends into the band recesses 11, the nuts 10 are arranged in the recesses 11, and the bolts 9 are inserted through the screw inserting holes at both ends of the band 8 from the screw fitting holes 12 on the inner peripheral surface side and are threadedly engaged with the nuts 10, fastened, and fixed.

Figure 6:
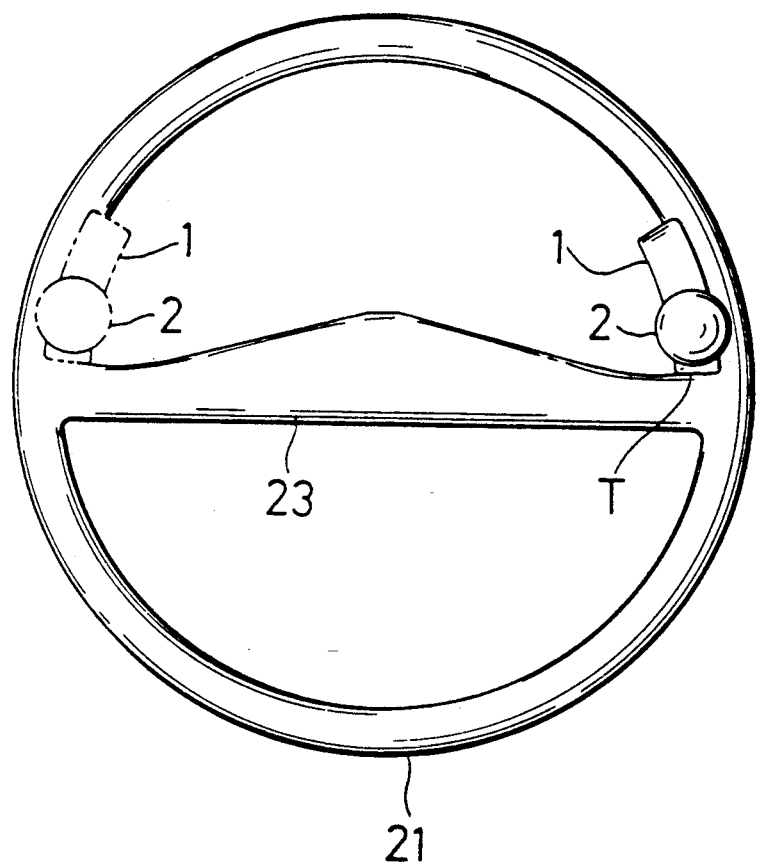
FIG. 6 is an explanatory view showing the position of fitting the apparatus of the first embodiment on a steering wheel.

In the position in which the steering wheel rotating apparatus is installed on the steering wheel, as shown in FIG. 6, while the end surface T on the rotary grip 2 side of the grip holder 1 contacts or approaches a center member 23 crossing in the diametrical direction (horizontal direction) of steering wheel 21 in the straight ahead state, the steering wheel rotating apparatus will be fixed on the right side of the center member 23 in a car with the steering wheel on the right side, or on the left side (two-point chain line) of the center member in a car with the steering wheel on the left side. The steering wheel rotating apparatus is fixed a little above the position of the intermediate height of the steering wheel 21 in the straight ahead state. As the grip hole 4 and switch hole 6 provided in the grip holder 1 are through holes that can be engaged from either open end, on whichever side of the steering wheel the steering wheel rotating apparatus is to be fitted, the apparatus can be installed without changing the characteristic that the rotary grip 2 is arranged near the intermediate height of the steering wheel and the horn switch 3 is arranged a little above it.

Figure 4:
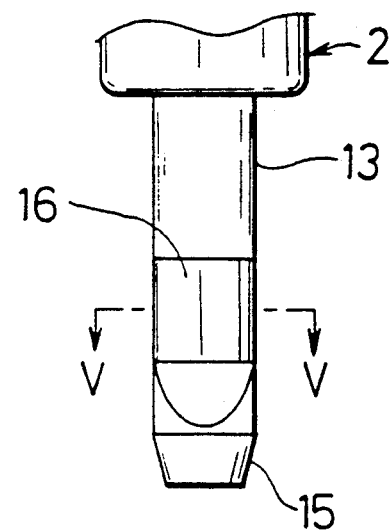
FIG. 4 is an elevational view showing the shaft part of a rotary grip in the first embodiment.

As shown in FIGS. 2, 4 and 5, the rotary grip 2 includes a metallic shaft 13 that can be freely fitted into the grip hole 4 of the grip holder 1 and a grip body part 14 fitted rotatably to the shaft 13. The grip body part 14 is integral with a resin part 14B on the outer periphery of a metal cylinder 14A fitted rotatably on the outer periphery of the shaft 13. The shaft 13 mostly has the shape of a right square prism so as to be fitted into the grip hole 4, and its tip has a taper 15 so as to be easily fitted into the grip hole 4. In the part in contact with the movable portion 5a of the lever 5 (engaging member) projecting on the inside surface of the grip hole 4 when the shaft 13 is fitted into the grip hole 4, there is provided an engaging part 16 having a cylindrical cross-section and partly made smaller than the right square prism as shown in FIG. 5 to engage the movable portion 5a of the lever 5.

Next, the method of installing the rotary grip 2 on the grip holder 1 will be explained. In removing the rotary grip 2 fitted to the grip holder 1, first of all, when the operating portion 5b of the lever 5 for removal is pushed as shown by arrow C, to move the movable portion 5a from its first position to its second position, the movable portion 5a of the lever 5 engaged with the engaging part 16 of the shaft 13 will retract from the inside surface of the grip hole 4, and when the rotary grip 2 is lifted up, it can be removed from the grip hole 4. In fitting the rotary grip 2 to the grip holder 1, when the shaft 13 of the rotary grip 2 is fitted and pushed into the grip hole 4, the movable portion 5a of the lever 5 projecting on the inside surface of the grip hole 4 will engage the engaging part 16 of the shaft 13, which, in this state, cannot be pulled out. The rotary grip 2 can be simply installed and removed with one hand so that even a person physically handicapped in one hand may install and remove it.

In this embodiment, when the rotary grip 2 of the steering wheel rotating apparatus is gripped and rotated with one hand (the right hand, for example, in the case of a car with a steering wheel on the right side), the steering wheel can be operated the same as ordinarily. Although the shaft 13 securely engages the grip holder 1, as the grip body part 14 gripped by a hand is rotatably fitted to the shaft 13, the steering wheel can be smoothly operated.

Figure 7:
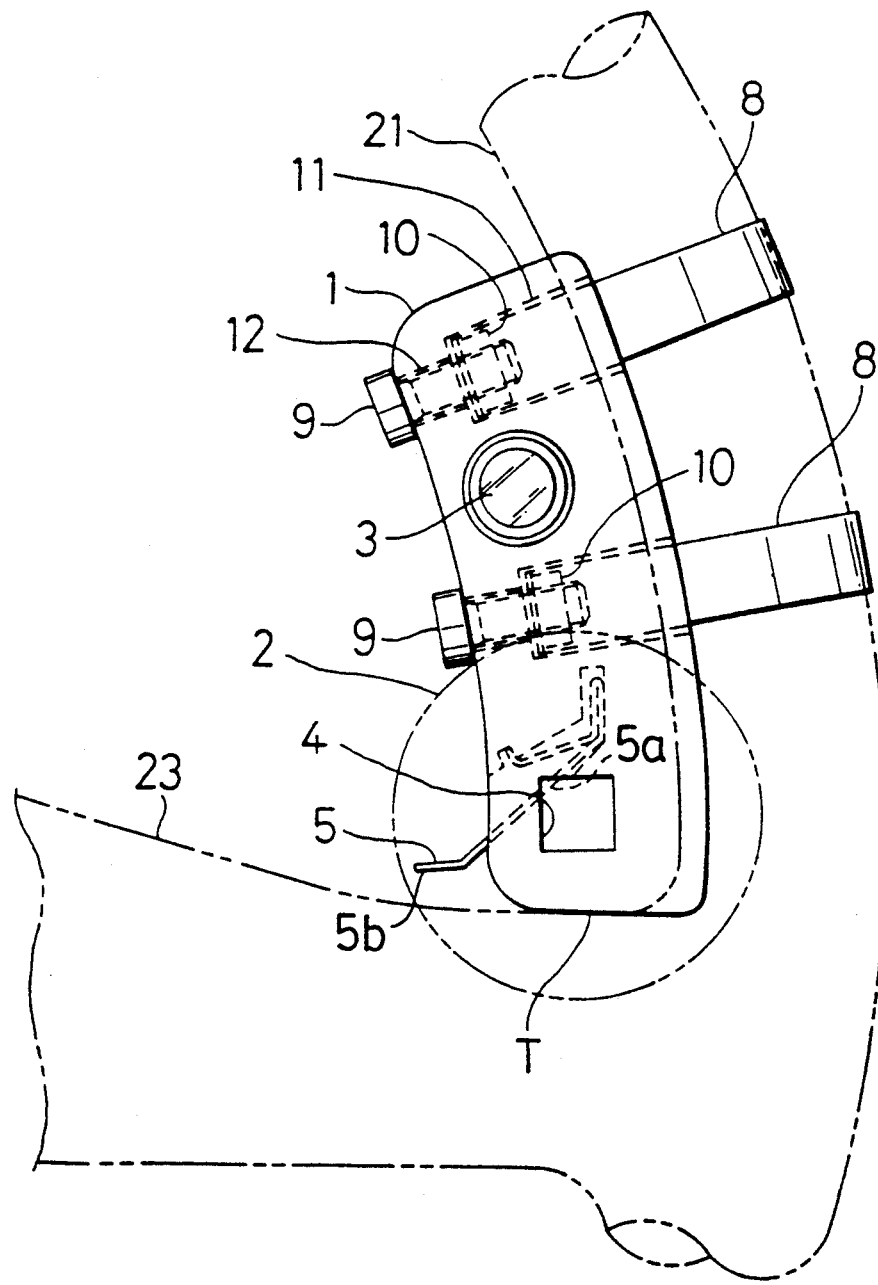
FIG. 7 is a plan view showing a second embodiment of the present invention.

FIG. 7 shows a second embodiment of the present invention. In this second embodiment, the grip hole 4 is provided on the end surface T side of the grip holder 1 contacting or approaching the center member 23 of the steering wheel 21 so that the rotary grip 2 may be removably installed. The fitting positions of the bands 8, bolts 9, and nuts 10 are moved to the end surface side, separate from the center member 23, the horn switch 3 is fitted between both bands 8, and the fitting positions of the rotary grip 2 and horn switch 3 are further moved nearer to the intermediate height of the steering wheel than in the first embodiment. The structure is otherwise the same as in the first embodiment.

Figure 8:
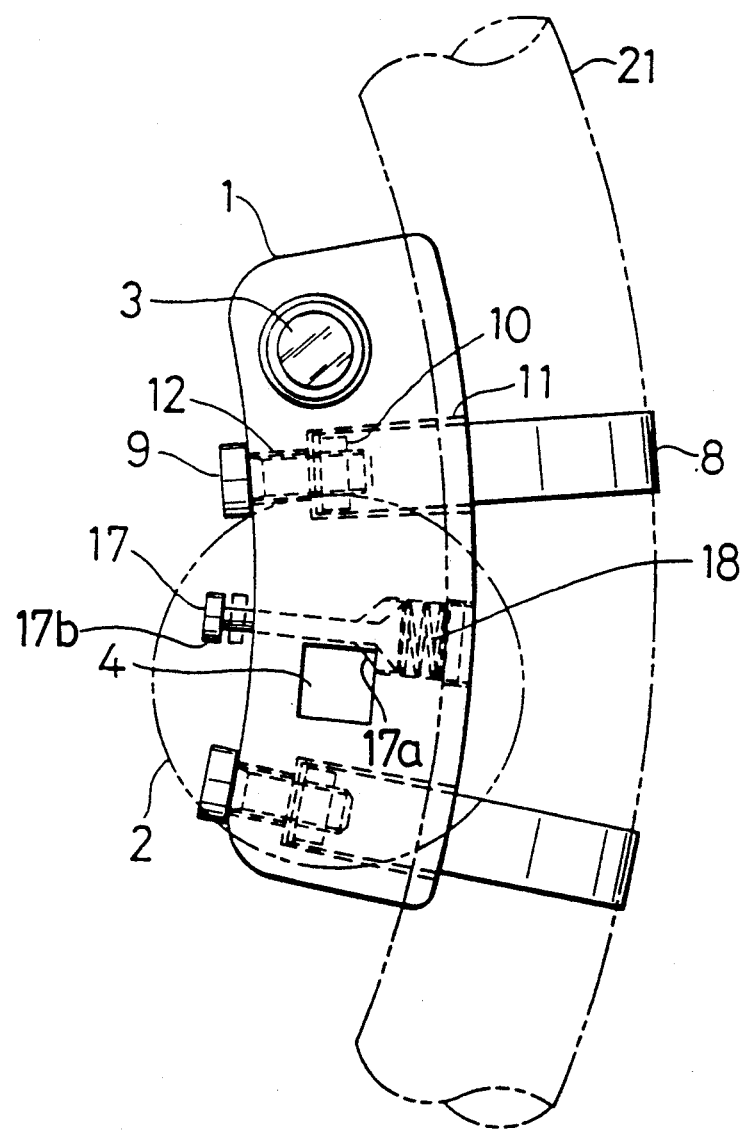
FIG. 8 is a plan view showing a third embodiment of the present invention.
Figure 9:
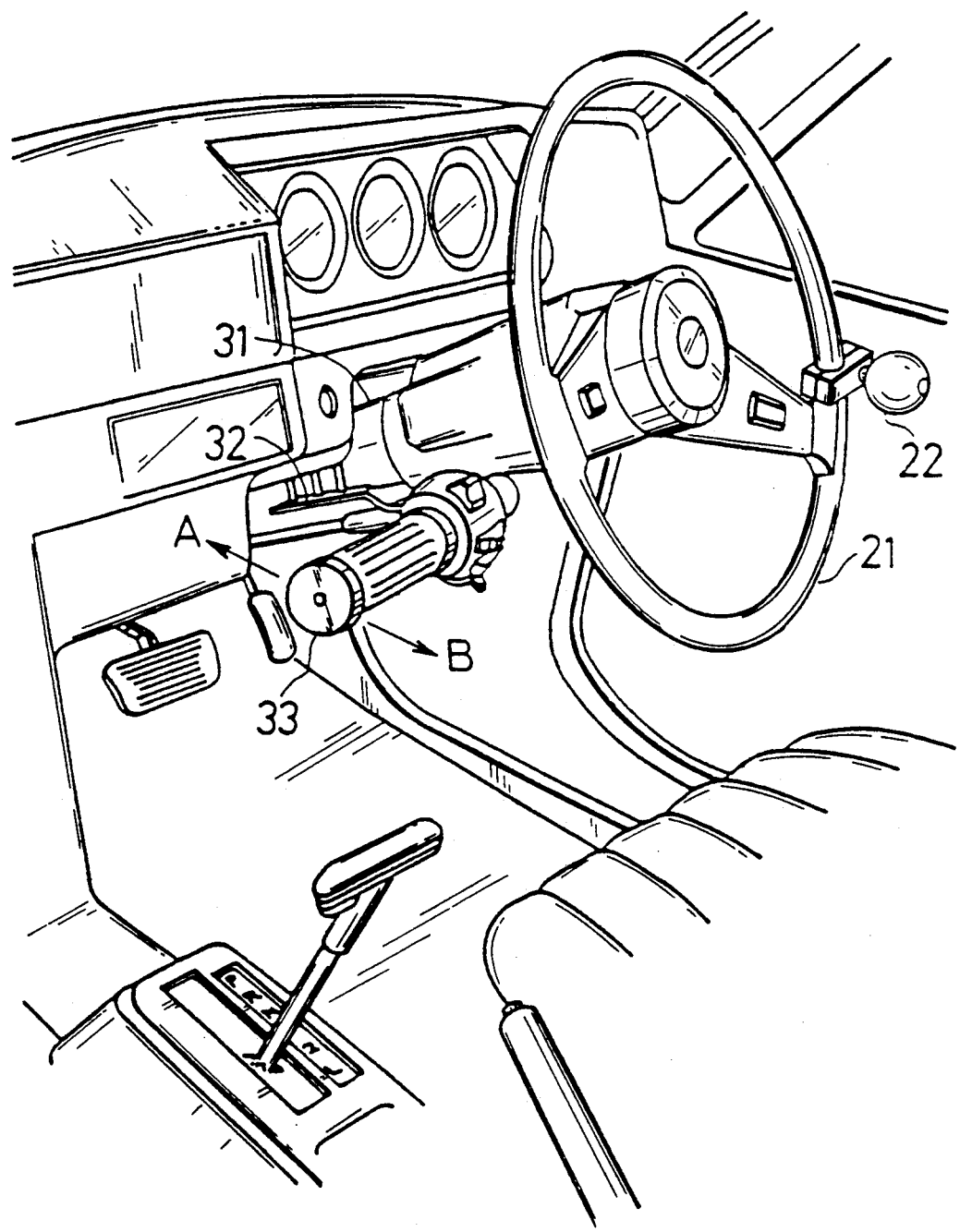
FIG. 9 is a perspective view of a conventional automobile operating apparatus for physically handicapped persons as seen from above the driver's seat.

FIG. 8 shows a third embodiment of the present invention. In this third embodiment, a push rod 17 is used as an engaging member. The push rod 17 includes a movable portion 17a that projects from the inside surface of the grip hole 4 and an operating portion 17b in the form of an outer end for moving the movable portion. The push rod 17 is biased by a spring 18, disposed within the grip holder 1, towards a first position shown in FIG. 8 in which the movable portion 17a projects from the inside surface of the grip hole 4 and is engageable with the engaging part 16 of the shaft 13 of the rotary grip 2 shown in FIGS. 4 and 5, just as the lever 5 shown in the first embodiment is engageable. The method of removably fitting the rotary grip 2 to the grip holder 1 is as follows. In removing the rotary grip 2, when the rotary grip 2 is lifted up while pushing the operating portion 17b of the push rod 17, the movable portion 17a of the push rod 17 engaged with the engaging part 16 of the shaft 13 retracts from the inside surface of the grip hole 4 to a second position shown by broken lines and the rotary grip 2 can be removed from the grip hole 4. In fitting the rotary grip 2 to the grip holder 1, when the shaft 13 of the rotary grip 2 is fitted and pushed into the grip hole 4, the movable portion 17a projecting on the inside surface of the grip hole 4 of the push rod 17 will engage the engaging part 16 of the shaft 13 and will not be pulled out and the rotary grip 2 will be fitted. The structure of this embodiment is otherwise the same as in the first embodiment.

As explained above, according to the present invention, in case a person physically handicapped in the lower limbs is to drive an automobile, when the accelerator and brake are operated by using one hand through an automobile operating apparatus for physically handicapped persons and the rotary grip of the steering wheel rotating apparatus is gripped and rotated with the other hand, the steering wheel will be able to be operated by one hand. Even a person physically handicapped in one hand, ordinarily operating the accelerator and brake with a foot, can grip the rotary grip of the steering wheel rotating apparatus and rotate the steering wheel with only one hand, so that the steering wheel can be operated. In this case, as the grip (grip body part) of the rotary grip is rotatable and the steering wheel can be smoothly operated, there is an advantage that the operability is so high that, even in the case of long operation, the operator will not become tired. Also, as the rotary grip is removably fitted to the grip holder by the operation of the engaging member, when the steering wheel rotating apparatus is not used, such as when a non-handicapped person operates the automobile, the rotary grip can be easily removed, eliminating fear that the sleeve end of the operator may catch on the grip, as in the conventional apparatus. Ordinary operation of the steering wheel will not interfered with. Further, when the steering wheel rotating apparatus is used, the rotary grip is easily installed with one touch.

What is claimed is:

1. A steering wheel rotating apparatus for physically handicapped persons comprising:
   a grip holder having a grip hole formed therein and means for attaching the grip holder to a steering wheel of an automobile;
   a rotary grip having a shaft with an engaging portion and a grip body part rotatably mounted on the shaft, the shaft being detachably received in the grip hole; and
   an engaging member supported by the grip holder and having a movable portion supported for movement between a first position in which the movable portion projects into the grip hole and engages with the engaging portion of the shaft and prevents the shaft from being removed from the grip hole and a second position in which the movable portion is disengaged from the engaging portion, biasing means biasing the movable portion of the engaging member toward the first position, and an operating portion connected to the movable portion and projecting from the grip holder for moving the movable portion between its first and second positions.

2. A steering wheel rotating apparatus according to claim 1 wherein the grip holder has first and second opposite outer sides, the grip hole is a through hole having first and second open ends formed in the first and second sides, respectively, each open end being shaped to receive the shaft, and the shaft is shaped for insertion into the grip hole and engagement with the movable portion of the engaging member from either open end of the grip hole.

3. A steering wheel rotating apparatus according to claim 2 wherein the grip holder has a switch hole having open ends formed in the first and second outer sides of the grip holder, the apparatus further comprising a horn switch fitted into the switch hole from either open end of the switch hole.

4. A steering wheel rotating apparatus according to claim 3 wherein the switch and the grip body part are disposed on the same side of the grip body.

5. A steering wheel rotating apparatus according to claim 2 wherein the engaging member is disposed within the grip holder and the movable portion extends into the grip hole between the ends of the grip hole when in its first position.

6. A steering wheel rotating apparatus according to claim 1 wherein the engaging member comprises a flexible lever supported by the grip holder and having an end projecting from the grip holder, the lever being bendable between the first and second positions, the biasing means comprising a flexible portion of the lever, the operating portion comprising the projecting end of the lever, and the movable portion comprising a portion of the lever between the biasing means and the operating portion.

7. A steering wheel rotating apparatus according to claim 1 wherein the grip holder has an arcuate outer periphery.

8. A steering wheel rotating apparatus according to claim 1 wherein the shaft of the rotary grip has a tapered end.

9. A steering wheel rotating apparatus for physically handicapped persons comprising:
   a grip holder having a grip hole formed therein and means for attaching the grip holder to a steering wheel of an automobile;
   a rotary grip having a shaft with an engaging portion and a grip body part rotatably mounted on the shaft, the shaft being detachably received in the grip hole; and
   an engaging member comprising a rod having an end projecting from the grip holder and a movable portion, the rod being slidably supported by the grip holder for movement between a first position in which the movable portion projects into the grip hole and engages with the engaging portion of the shaft and prevents the shaft from being removed from the grip hole and a second position in which the movable portion is disengaged from the engaging portion, the engaging member comprising a spring biasing the rod toward the first position.

10. A steering wheel rotating apparatus for physically handicapped persons comprising:
    a rotary grip having a shaft with an engaging portion and a grip body part rotatably mounted on the shaft;
    a grip holder having an inner periphery, an arcuate outer periphery shaped to receive an inner periphery of a steering wheel, first and second opposite outer sides, and a grip hole having a first end formed in the first side and a second end formed in the second side, both ends being shaped to receive the shaft, the shaft being received in the grip hole through one of the ends; and
    an engaging member disposed in the grip holder between the first and second sides and comprising a movable portion supported for movement between a first position in which the movable portion engages the engaging portion of the shaft and prevents the shaft from being removed from the grip hole and a second position in which the movable portion is disengaged from the engaging portion, biasing means for biasing the movable portion towards the first position, and an operating portion connected to the movable portion and projecting from the inner periphery of the grip holder for moving the movable portion between its first and second positions, the movable portion of the engaging member being engageable with the engaging portion of the shaft regardless of on which of the first and second sides of the grip holder the grip body part is located.

* * * * *